(No Model.)
G. F. SIMONDS.
DIE FOR MAKING ROLLED FORGINGS.
No. 384,091. Patented June 5, 1888.
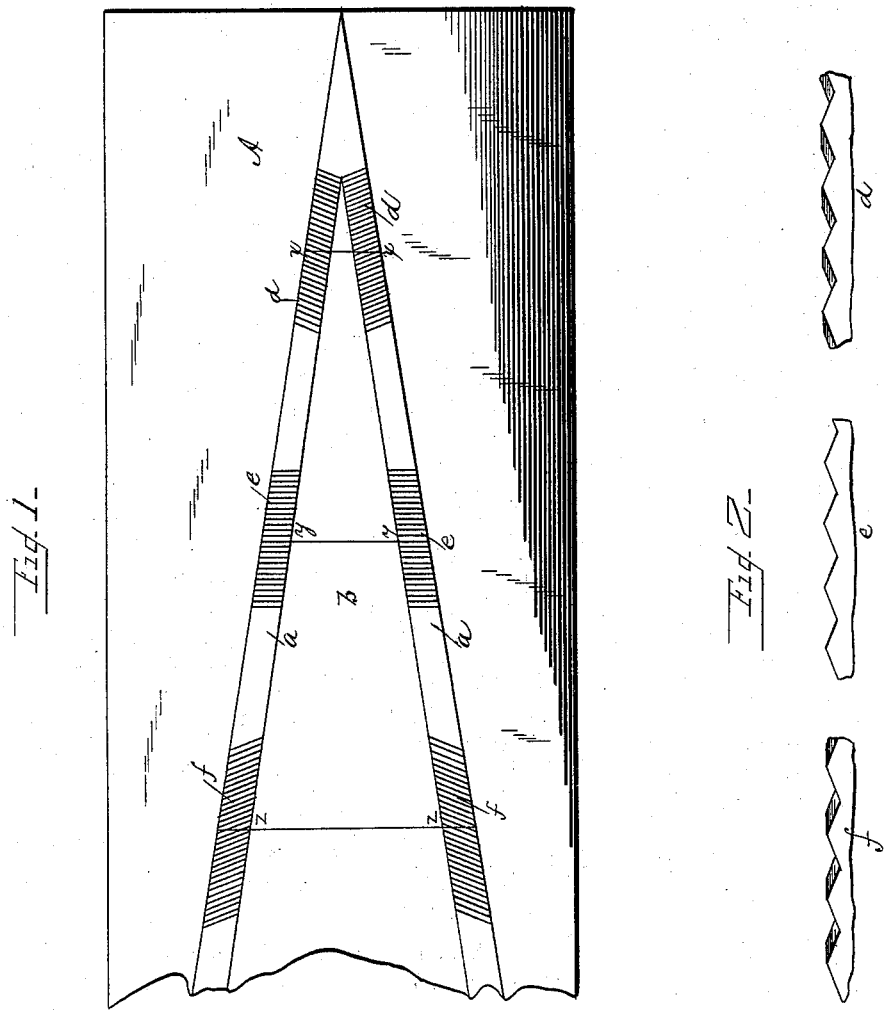

UNITED STATES PATENT OFFICE.

GEORGE F. SIMONDS, OF FITCHBURG, MASSACHUSETTS.

DIE FOR MAKING ROLLED FORGINGS.

SPECIFICATION forming part of Letters Patent No. 384,091, dated June 5, 1888.

Application filed November 2, 1887. Serial No. 254,066. (No model.)

*To all whom it may concern:*

Be it known that I, GEORGE F. SIMONDS, of Fitchburg, State of Massachusetts, have invented a new and useful Improvement in Dies for Making Rolled Forgings, of which the following is a specification.

In the patents, Nos. 319,754, 319,755, and 319,756, granted to me June 9, 1885, there were described and represented dies for forming articles circular in cross-section by rolling bars of iron between a pair of dies moving in opposite directions. One of the features of those dies was a provision for making the bar to be rolled engage with the dies in such a way that the rotation of the bar between the dies as they moved in opposite directions should be insured and the displacement of the bar in relation to the dies prevented. This was accomplished by cutting teeth or corrugations across the faces of what is called in the first of said patents the "reducing" and "spreading" surfaces of the dies.

My present invention relates to an improvement in these teeth or corrugations. As originally constructed by me, these teeth were cut directly across the reducing and spreading surfaces of a die in the same manner as gear-teeth, when parallel with the axis of a wheel, are cut across the periphery of a wheel; but by reason of the inclination of these reducing and spreading surfaces to the lines of travel of the die, the lines of the teeth would run obliquely across the lines of travel of the die, and across the axis of the bar or lines parallel thereto. I have found that it is much better to cut the teeth obliquely across the face of the reducing and spreading surface, inclining from the surface on which the die is raised forward in the direction of the line of travel of the die when rolling an article.

The corresponding teeth or corrugations formed in the bar on which the dies are operating by teeth cut in this way are much more easily and effectually destroyed or obliterated in the process of rolling than those formed by teeth cut directly across the face of the reducing and spreading surfaces in the manner shown in the patents referred to.

In Figure 1 of the drawings hereto annexed I have represented the reducing and spreading surfaces of a die with teeth formed as shown in the patents above referred to and in the manner which I have found to be an improvement.

A represents a bed or platen on the surface of which the dies are raised.

*a a* represent the reducing and spreading surfaces, and *b* the intervening surface. The exterior lines of the reducing and spreading surfaces are the lower lines of such surfaces, or the lines formed by the intersection of such surfaces with the surface on which they are raised. The interior lines are the lines of the upper limit of such surfaces. The transverse lines *d d* near the apex of the triangular figure formed by the reducing and spreading surfaces represent teeth cut across the face of such surfaces, in the manner shown in the patents above referred to. The line *x x* is drawn at right angles with the line of travel of the dies, and when rolling an article the direction in which the die travels is toward the apex of the triangular figure. It will be observed that the teeth are represented as inclining backward with reference to the line of travel of the die when rolling an article from the lower edges of the reducing and spreading surfaces to the upper edge.

At the parts in the neighborhood of the transverse lines *y y* and *z z* teeth are represented, formed in the manner which I have found to be an improvement. They are indicated by the letters *e e* and *f f*. They are inclined with reference to the line of travel of the die from the lower line of the reducing and spreading surfaces to the upper line in the direction in which the die travels when rolling an article and in the opposite direction from that in which they were formed in the patents above referred to.

Another improvement in the reducing and spreading surfaces relates to the form of the corrugations on such surfaces for engaging with the bar to be rolled, and is represented in Fig. 2 of the drawings hereto annexed. It is designed to facilitate the removal of the teeth-marks as the shaping proceeds over the bar. As first used by me, the angles of the surfaces of the teeth with each other were right angles, or substantially that. My present improvement consists in making these angles decidedly obtuse, as shown in Fig. 2, and for the best results from one hundred and twenty to one hundred and thirty degress. When the angles are right angles or less, there is a liability that when the corresponding teeth in the bar are brought under the pressure of the reducing and forming surfaces of the dies they will not be forced down into the mass of the metal of the bar so as to leave no trace of their existence, but will be turned over so as to form a seam, or be so incompletely forced into the mass of the metal as to leave the appearance of a seam. This liability is avoided by forming the teeth at obtuse angles, as shown in Fig. 2.

I claim as my improvement—

1. In the construction of the reducing and spreading surfaces of dies for making rolled forgings, the inclination of the teeth from the lower or base line of such surfaces to the upper line in the direction of the line of travel of the dies when rolling an article.

2. The construction of the teeth or corrugations with their surfaces forming obtuse angles.

GEO. F. SIMONDS.

Witnesses:
JOS. P. LIVERMORE,
M. E. HILL.